(12) United States Patent
De Vogel et al.

(10) Patent No.: US 10,367,445 B2
(45) Date of Patent: Jul. 30, 2019

(54) CARRIER STRUCTURE FOR SOLAR PANELS AND METHOD OF PRODUCING SUCH A CARRIER STRUCTURE

(71) Applicant: Esdec B.V., Deventer (NL)

(72) Inventors: Jeroen De Vogel, Gorssel (NL); Vincent De Vogel, Colmschate (NL)

(73) Assignee: Esdec B.V., Deventer (NL)

( * ) Notice: Subject to any disclaimer, the term of this patent is extended or adjusted under 35 U.S.C. 154(b) by 274 days.

(21) Appl. No.: 15/034,886

(22) PCT Filed: Nov. 7, 2014

(86) PCT No.: PCT/NL2014/050774
§ 371 (c)(1),
(2) Date: May 6, 2016

(87) PCT Pub. No.: WO2015/069112
PCT Pub. Date: May 14, 2015

(65) Prior Publication Data
US 2016/0285407 A1 Sep. 29, 2016

(30) Foreign Application Priority Data

Nov. 8, 2013 (NL) .................................. 2011769
Dec. 30, 2013 (NL) .................................. 2012039
(Continued)

(51) Int. Cl.
*H01L 31/044* (2014.01)
*H02S 20/23* (2014.01)
(Continued)

(52) U.S. Cl.
CPC .............. *H02S 20/23* (2014.12); *F24S 25/13* (2018.05); *F24S 25/16* (2018.05); *F24S 25/65* (2018.05);
(Continued)

(58) Field of Classification Search
CPC ....... H01L 31/00–078; Y02E 10/50–60; H02S 10/00–40; H02S 20/00–32;
(Continued)

(56) References Cited

U.S. PATENT DOCUMENTS 8,938,932 B1 * 1/2015 Wentworth ............. H02S 20/23
52/747.1
2007/0144575 A1 6/2007 Mascolo et al.
(Continued)

FOREIGN PATENT DOCUMENTS

DE 102006028260 A1 1/2008
EP 2234173 A2 9/2010
(Continued)

*Primary Examiner* — Bach T Dinh
(74) *Attorney, Agent, or Firm* — The Webb Law Firm

(57) ABSTRACT

The invention relates to a carrier structure (1) for solar panels. The invention also relates to a carrier (6) for use in a carrier structure (1) according to the invention. The invention then relates to an accessory (3) for use in a carrier structure (1) according to the invention. The invention furthermore relates to an assembly of at least one carrier structure (1) and at least one solar panel. In addition, the invention relates to a method for producing a carrier structure (1) according to the invention.

18 Claims, 7 Drawing Sheets

US 10,367,445 B2
Page 2

(30) Foreign Application Priority Data

Dec. 30, 2013 (NL) .................................... 2012040
Dec. 30, 2013 (NL) .................................... 2012041
Jan. 17, 2014 (NL) .................................... 2012098

(51) Int. Cl.
*H02S 20/24* (2014.01)
*F24S 40/10* (2018.01)
*F24S 25/16* (2018.01)
*F24S 25/13* (2018.01)
*F24S 25/65* (2018.01)
*F24S 25/60* (2018.01)

(52) U.S. Cl.
CPC .............. *F24S 40/10* (2018.05); *H02S 20/24* (2014.12); *F24S 2025/6007* (2018.05); *Y02B 10/12* (2013.01); *Y02E 10/47* (2013.01)

(58) Field of Classification Search
CPC ......... H02S 30/00–20; H02S 40/00–44; H02S 50/00–15; H02S 99/00
USPC .................................................. 136/243–265
See application file for complete search history.

(56) References Cited

U.S. PATENT DOCUMENTS

| | | |
|---|---|---|
| 2007/0151594 A1 | 7/2007 | Mascolo et al. |
| 2009/0242014 A1 | 10/2009 | Leary |
| 2010/0243034 A1 | 9/2010 | Hu et al. |
| 2011/0088740 A1 | 4/2011 | Mittan et al. |
| 2012/0204935 A1 | 8/2012 | Meyer et al. |
| 2012/0251226 A1 | 10/2012 | Liu et al. |
| 2013/0011187 A1* | 1/2013 | Schuit .................... F16B 2/065 403/287 |
| 2013/0015303 A1 | 1/2013 | Gies et al. |
| 2013/0056048 A1 | 3/2013 | Bleibler et al. |
| 2013/0185916 A1 | 7/2013 | Mantei et al. |

FOREIGN PATENT DOCUMENTS

| | | |
|---|---|---|
| EP | 2416088 A2 | 2/2012 |
| FR | 862347 | 3/1941 |
| GB | 1032307 | 6/1966 |
| JP | 6239013 U | 3/1987 |
| NL | 6817070 | 6/1969 |
| NL | 2011769 C | 5/2015 |
| WO | 2009120923 A2 | 10/2009 |
| WO | 2011046578 A1 | 4/2011 |
| WO | 2012021650 A2 | 2/2012 |

* cited by examiner

CARRIER STRUCTURE FOR SOLAR PANELS AND METHOD OF PRODUCING SUCH A CARRIER STRUCTURE

CROSS-REFERENCE TO RELATED APPLICATIONS

This application is the United States national phase of International Application No. PCT/NL2014/050774 filed Nov. 7, 2014, and claims priority to The Netherlands Patent Application No. 2011769 filed Nov. 8, 2013; Nos. 2012040, 2012039, and 2012041 all filed Dec. 30, 2013; and No. 2012098 filed Jan. 17, 2014, the disclosures of which are hereby incorporated in their entirety by reference.

The invention relates to a carrier structure for solar panels. The invention also relates to a carrier for use in a carrier structure according to the invention. The invention then relates to an accessory for use in a carrier structure according to the invention. The invention furthermore relates to an assembly of at least one carrier structure and at least one solar panel. In addition, the invention relates to a method of producing a carrier structure according to the invention.

Fitting solar panels on a horizontal or slightly diagonal roof is achieved by using a carrier structure. Such carrier structures are known in various variant embodiments, wherein the carrier structures may, for example, be formed as a plastic carrier tray for carrying one or more solar panels. Such carrier trays are usually bulky and heavy, and therefore difficult to handle. It is also known to construct the carrier structure in modular fashion from several components which are attached to one another by means of screws or similar fastening elements. The advantage of such a modular structure is that it is easier to handle than the aforementioned carrier tray, but this is advantageous from a practical point of view. A drawback of the known modular carrier structure is the fact that it is relatively labor-intensive and therefore costly to construct the modular carrier structure. A further drawback of the known carrier structure is that it is relatively susceptible to wind loads.

It is an object of the invention to provide a carrier structure of the type mentioned in the preamble, which can be produced in a relatively simple manner and which is preferably less susceptible to wind loads.

To this end, the invention provides a carrier structure of the type mentioned in the preamble, comprising: at least one carrying frame configured to carry at least a part of at least one solar panel, and at least one accessory which is coupleable to the carrying frame, wherein at least one of the at least one carrying frame and the at least one accessory comprises at least one coupling pin configured to be at least partly received in a complementary receiving space provided in at least one of the at least one accessory or the at least one carrying frame, wherein the coupling pin and/or the receiving space is provided with at least one locking element for locking the accessory and the carrying frame to each other when the coupling pin is being fitted in the receiving space. By coupling the carrying frame and the accessory to each other by pushing a coupling pin in a complementary receiving space (or vice versa) intended for the purpose, as a result of which the coupling pin is locked with respect to the receiving space by means of the at least one locking element, a relatively stable snap fastening (push-on coupling) is provided which can be achieved relatively quickly and easily. No separate fastening means, such as screws, adhesive and the like, are required for this purpose. Installation (manufacture) of the modular carrier structure can accordingly be carried out in a relatively quick, simple and inexpensive manner. As a rule, the carrying frame of the carrier structure will be configured to be placed on substantially flat horizontal or slightly diagonal roofs, wherein the solar panels are often given a tilted orientation to face a desired wind direction. The carrying frame as such is preferably also of modular design. Various variant embodiments will be discussed below. The accessory is de facto an add-on which can be attached to the carrying frame in a quick, efficient and durable manner. In this case, the accessory does not form part of the carrying frame as such, but provides the carrier structure with at least one additional functionality. Preferably, the accessory is formed by a wind guide, in particular a wind guard. This wind guard may be of a flat or curved design. By allowing a wind guard to be coupled to the carrying frame in a relatively simple manner by means of a snap fastening, the carrier structure can be made less susceptible to wind loads, which usually benefits the stability and service life of the carrier structure as such. It is also conceivable for the accessory to be formed by a cable trough for guiding electric cables. Other types of accessories which can be attached to the carrying frame relatively easily are also conceivable.

The carrying frame may be provided with the at least one receiving space. It is also conceivable for the accessory to be provided with the at least one receiving space. The same applies to the coupling pin; the carrying frame may be provided with at least one coupling pin. It is also conceivable for the accessory to be provided with at least one coupling pin. A combination of the aforementioned variants is also conceivable. As a rule, it is preferable for the carrying frame to be provided with one or more coupling pins, since the carrying frame is as a rule of a relatively sturdy construction, and for the accessory to be provided with one or more receiving spaces for cooperating with the aforementioned coupling pin(s), since the accessory often consists of a relatively thin-walled structure, in particular sheet material.

As a rule, the coupling pin will be elongate. Often, the coupling pin will be of a substantially rigid (dimensionally stable) design. However, it is also conceivable for the coupling pin to be at least partly resilient. In this case, it is for example conceivable for the coupling pin to be provided with a central groove which extends in the longitudinal direction and de facto divides the coupling pin into several pin portions. The pin portions may in this case be mutually deformable, as a result of which the coupling pin is formed by a peg. An outer side of the coupling pin may be substantially smooth. However, it is also conceivable for the outer side of the coupling pin to be provided with profiling, which may benefit the intended locking action.

The locking coupling between the accessory and the carrying frame is preferably such that both components of the carrier structure can be disconnected again. This makes it possible to disassemble the carrier structure again and to replace components of the carrier structure. However, it is also conceivable for this coupling to have a more permanent character, once it has been achieved. The locking action which can be achieved by using the at least one locking element may be produced in various ways. It is for example conceivable to fasten the locking element to the coupling pin so as to be hingable, in which case the locking element is optionally manually displaceable between a locking position and a non-locking position. The at least one locking element may be fitted in or form part of the receiving space. It is also conceivable for the at least one locking element to be fitted on or form part of the coupling pin. A combination of both variant embodiments, in which several locking elements are used, is also conceivable. The one or more locking elements may form an integral part of the accessory and/or the carrying frame. As a rule, the one or more locking elements are made of metal and/or plastic.

In a preferred embodiment, the receiving space is provided with at least one resilient locking element which is configured to engage in a clamping manner, in the coupled position, with an external side of the coupling pin (under prestress). By inserting the coupling pin in the receiving space, the at least one locking element will (automatically) engage with an external side of the coupling pin, as a result of which a clamping engagement of the at least one locking element with the coupling pin is produced which results in the desired locking action. In this case, the at least one locking element preferably defines at least a part of an inner periphery of the receiving space. In this case, it is advantageous if the resilient locking element, or at least an end thereof, and the external side of the coupling pin with which the locking element engages (and/or the longitudinal axis of the coupling pin) mutually enclose an angle. When inserting the coupling pin in the receiving space, the at least one locking element will in this case deform in the direction of movement of the coupling pin, as a result of which the desired engagement which encloses an angle is produced. Such an engagement makes it difficult to displace the coupling pin in the opposite direction, making it possible to counteract or prevent undesired detachment of the coupling pin from the receiving space. The angle which is enclosed in the coupled position between the locking element and the longitudinal axis of the coupling pin is preferably between 0 and 85 degrees, more preferably between 5 and 85 degrees, which as a rule creates sufficient resistance to be able to counteract undesired detachment of the coupling pin from the receiving space.

It is advantageous if the receiving space is provided with several, preferably resilient, locking elements configured to engage, in the coupled position, with an external side of the coupling pin in a clamping manner, wherein the locking elements together define at least a part of an inner periphery of the receiving space. By using several locking elements, the locking action can be reinforced and made stronger. In addition, the reliability of the locking action will be increased in this way, due to the fact that it no longer depends on the function of a single locking element. If one of the locking elements no longer functions correctly due to a defect, the locking action will still be ensured by the one or more other locking elements which maintain the locking action. Preferably, the locking elements together define the entire inner periphery of the receiving space in this case. Here, it is advantageous if the locking elements are displaceable (deformable) with respect to each other, as a result of which a segmented (ridged) inner periphery of the receiving space is produced. In this case, the locking elements will as a rule be positioned a distance apart in order to ensure free displacement (deformation) of each locking element. As a result of such an orientation of locking elements, the receiving space will function as an (internally ridged) locking ring or locking clip. The locking elements may be of identical design and size. It is also conceivable for different locking elements to be designed differently. The locking elements are preferably distributed substantially evenly over the inner periphery of the receiving space. As a rule, this results in a substantially even engagement of the locking elements on the peripheral side of the coupling pin, which generally benefits the locking action.

In order to produce a desired clamping action of the coupling pin in the receiving space, it is advantageous if the dimensions of the inner periphery of the receiving space are (slightly) smaller than the dimensions of an outer periphery of the coupling pin. As a result thereof, the receiving space and/or the coupling pin, in particular the one or more locking elements which are used in connection therewith, will have to be deformed in order to enable the coupling pin to be pushed into the receiving space, which generally benefits the intended locking action. This deformation will generally be of an elastic (resilient) nature, but it is also conceivable for at least part of the deformation to be of a plastic (permanent) nature. This makes it possible, for example, to provide the receiving space with one or more resilient locking elements which are configured to cut into an external side of the coupling pin, which will result in plastic deformation of the coupling pin and may improve the locking action. This may be achieved, for example, by providing an end of each locking element with a cutting edge and/or by making the coupling pin from a material which is softer (weaker) than the material from which the one or more locking elements are made.

In a preferred embodiment, an inner periphery of the receiving space and/or an outer periphery of the coupling pin is provided with at least one groove for receiving at least a part of at least one locking element. The use of a groove makes it possible to retain the end of each locking element—configured to cooperate with the groove—in the groove, which generally benefits the locking action. In addition, the use of the groove makes it possible to allow the one or more locking elements which were deformed during the displacement of the coupling pin into the receiving space to relax at least partly (counterdeform) in the groove, as a result of which a kind of click-fit connection can be produced between the accessory and the carrying frame. In this case, the coupling pin will generally be provided with an external groove, while an inner periphery of the receiving space is provided with one or more locking elements, as has already been discussed above. Such a variant embodiment is generally preferred from a practical point of view.

The carrying frame preferably comprises at least one carrier for supporting at least a part of at least one solar panel, and at least one substantially elongate beam which is coupleable to the carrier at one end. The one or more beams are used to couple several carriers to one another, resulting in a carrying frame for supporting one or more solar panels, and which is suitable for attaching one or more accessories thereto, such as wind guards and cable troughs. Preferably, each carrier is in this case supported by a foot which may be integrally connected with the carrier, but which, more preferably, is displaceable with respect to the carrier in order to be able to compensate for a thermal action.

In a preferred embodiment, the elongate beam and at least one carrier can be pushed into one another in order to produce a pin-hole joint, in such a way that a part of the beam is secured in a peripheral side of the beam in substantially each lateral direction by the at least one carrier and/or in such a way that a peripheral side of the at least one carrier is secured in substantially each lateral direction by the at least one beam. By pushing the beam and at least one carrier, preferably both carriers, into one another in such a way that a pin-hole joint is produced in which one frame part secures the other frame part on all sides, in each direction, a connection between the beam and at least one carrier, preferably both carriers, can be achieved relatively quickly which, in addition, is relatively stable due to the peripheral securement. As a result thereof, the carrier structure according to the invention can be constructed relatively quickly and inexpensively. Securement in each lateral direction is understood to mean peripheral securement (360°), i.e. securement in substantially every direction which is substantially perpendicular to a longitudinal axis of at least an end of the beam. The peripheral securement does not necessarily require the one frame part engaging with the entire periphery of the other frame part. In this case, there may be interruptions in the engagement, as a result of which it may even involve a point securement which fixes the secured frame part in the lateral direction. However, it is also conceivable for, for example, at least one carrier to be configured for substantially completely surrounding of the beam (or vice versa) in the lateral direction. In that case, the carrier engages with the entire periphery of the beam which may benefit the strength of the pin-hole joint. By inserting (pushing) the beam into at least one carrier, which results in a strong pin-hole joint, no screws or similar fastening elements are necessary to be able to construct a strong carrier frame, and thus a strong carrier structure, which is particularly advantageous from a practical and a cost perspective. The pin-hole joint may be single-sided or multi-sided, usually double-sided. The expression a single-sided pin-hole joint is understood to mean a connection between a single pin and a single hole, also referred to as receiving space. In the case of a multi-sided pin-hole joint, one or more pins cooperate with one or more holes. The direction in which the pin-hole joint extends may be from beam to carrier or vice versa. More particularly, it is conceivable for the beam to be provided with a receiving space for receiving a part of at least one carrier. However, it is also conceivable for at least one carrier to be provided with a receiving space for receiving a part of the beam, if desired in combination. Usually, this last embodiment, in which an end of the beam is inserted (pushed) into a receiving space of the carrier, will be preferred as this generally results in the strongest, simplest embodiment. In this case, it is advantageous if an outer periphery of the beam substantially corresponds to an inner periphery of the receiving space. In cross section, this design will usually be round, oval, angled or a combination thereof. Further variant embodiments are described in Dutch patent NL 2011769, which was not published before the priority date of the present application and the contents of which are deemed to be incorporated in the present patent by way of reference.

Preferably, each carrier is provided with at least one coupling pin for cooperating with a receiving space provided in the accessory. Often, the accessory is provided with several receiving spaces, in which case preferably each receiving space is provided with one or more locking elements. Often, each accessory, in particular a wind guard or a cable trough, will be attached to several carriers, so that the accessory can extend over a(n) (entire) side of the carrying frame, in which case the accessory can be attached to the carrying frame in a relatively stable manner.

The invention also relates to a carrier for use in a carrier structure according to the invention. Advantages and variant embodiments have already been described above. Further variant embodiments are shown in the figures and described below.

The invention furthermore relates to an accessory for use in a carrier structure according to the invention. Advantages and variant embodiments have already been described above. Further variant embodiments are shown in the figures and described below.

In addition, the invention relates to an assembly of a carrier structure according to the invention and at least one solar panel, wherein the solar panel is at least partly supported by the carrier structure. Advantages and variant embodiments have already been described above. Further variant embodiments are shown in the figures and described below.

Furthermore, the invention relates to a method of producing at least a part of a carrier structure according to the invention, comprising coupling the accessory to the carrying frame by fitting at least one coupling pin into at least one receiving space, in such a manner that the accessory is locked with respect to the carrying frame. In this case, the at least one coupling pin will be pushed into the receiving space (or vice versa), resulting in locking of the coupling pin and producing a snap fastening (push-on coupling). Preferably, in the coupled position, at least one locking element engages with an outer side of the coupling pin and/or a an inner side of the receiving space in a clamping manner, which often benefits the locking action. In this case, the at least one locking element will also be deformed, optionally temporarily. It is conceivable that during coupling of the accessory to the—often modular—carrying frame to be carried out by coupling the accessory to several carriers of the carrying frame. In this case, each carrier will as a rule be provided with at least one coupling pin, and the accessory will be provided with several receiving spaces, preferably formed by a (ridged) locking ring, with each receiving space being configured to cooperate with a coupling pin.

The invention will be explained with reference to the non-limiting exemplary embodiments illustrated in the following figures, in which:

FIG. 1 shows a carrier structure (1) for solar panels, comprising a carrying frame (2), configured to carry at least a part of at least one solar panel, and an accessory (3) coupled to the carrying frame (2), wherein the carrying frame comprises coupling pins (4) configured to be at least partly received in complementary receiving spaces (5) in the accessory (3).

Figure 1:
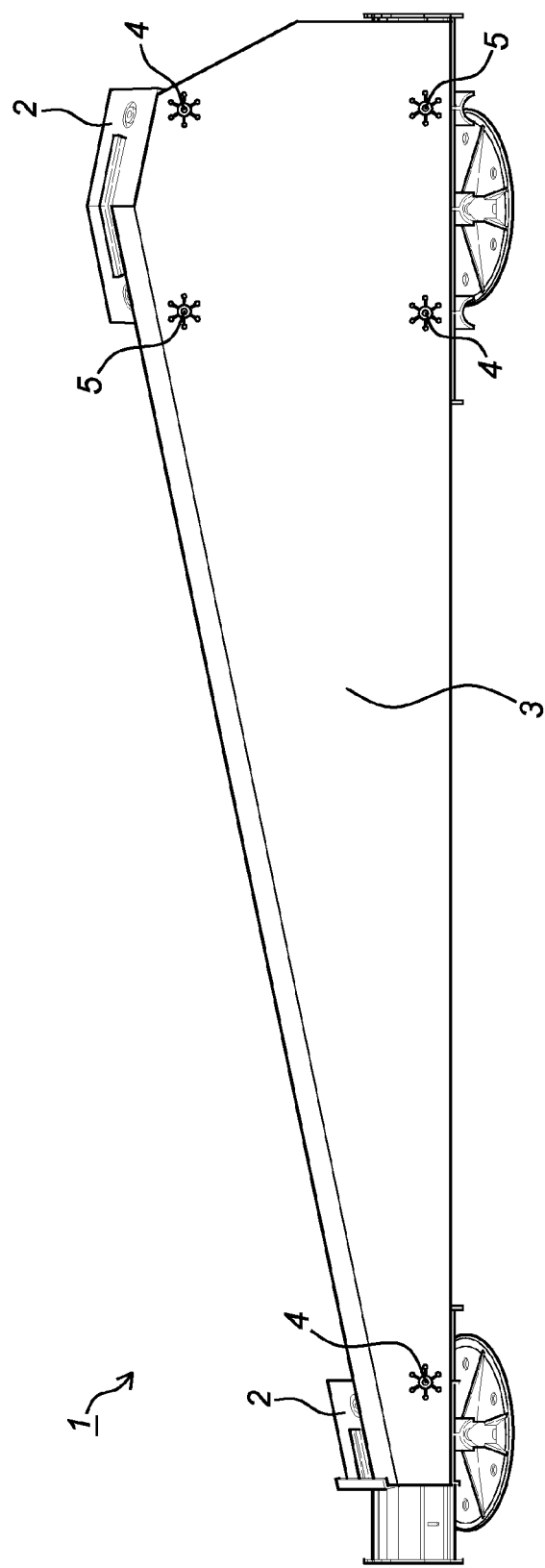
FIG. 1 shows a side view of a carrier structure according to the invention.
Figure 2:
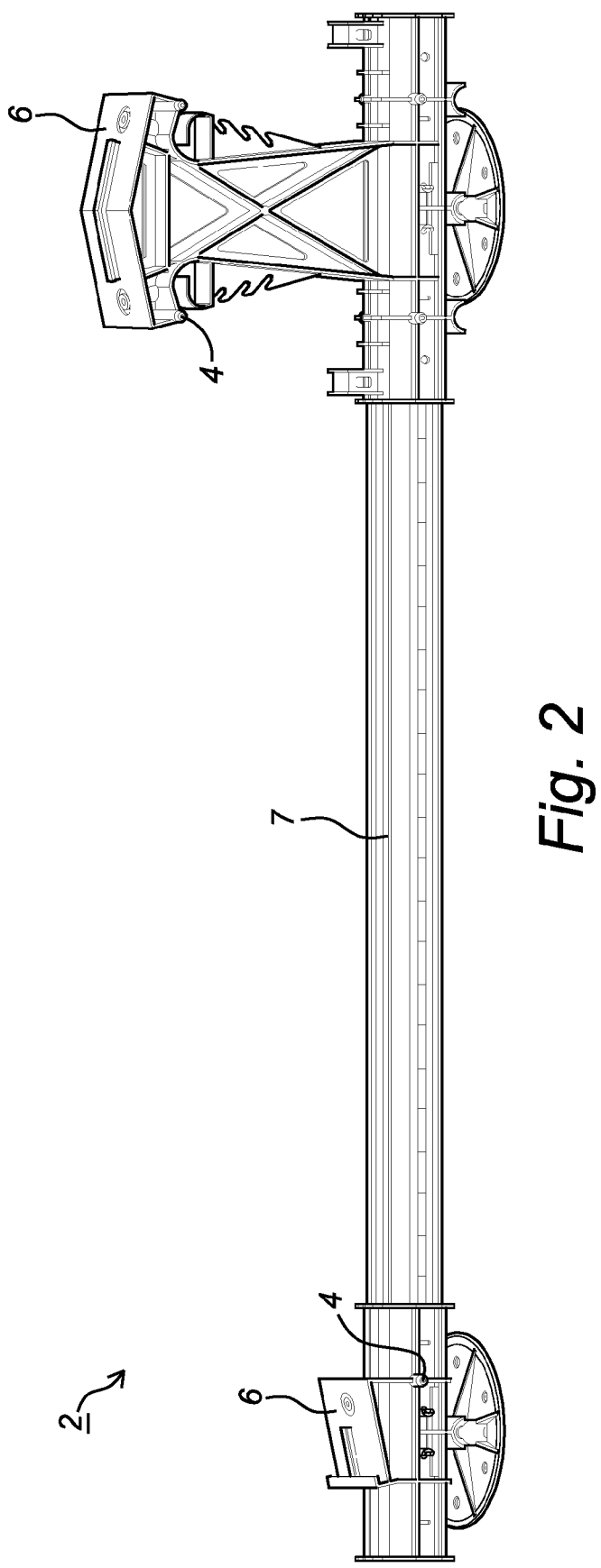
FIG. 2 shows a side view of a carrying frame according to the invention.

FIG. 2 shows a carrying frame (2) as illustrated in FIG. 1, without accessory (3). The carrying frame comprises two carriers (6) for supporting at least a part of one solar panel, and an elongate beam (7), wherein each end of the elongate beam is coupled to one of the carriers (6). The carriers (6) are each provided with coupling pins (4), configured to couple the carrying frame (2) to an accessory (3) (see FIG. 3).

Figure 3:
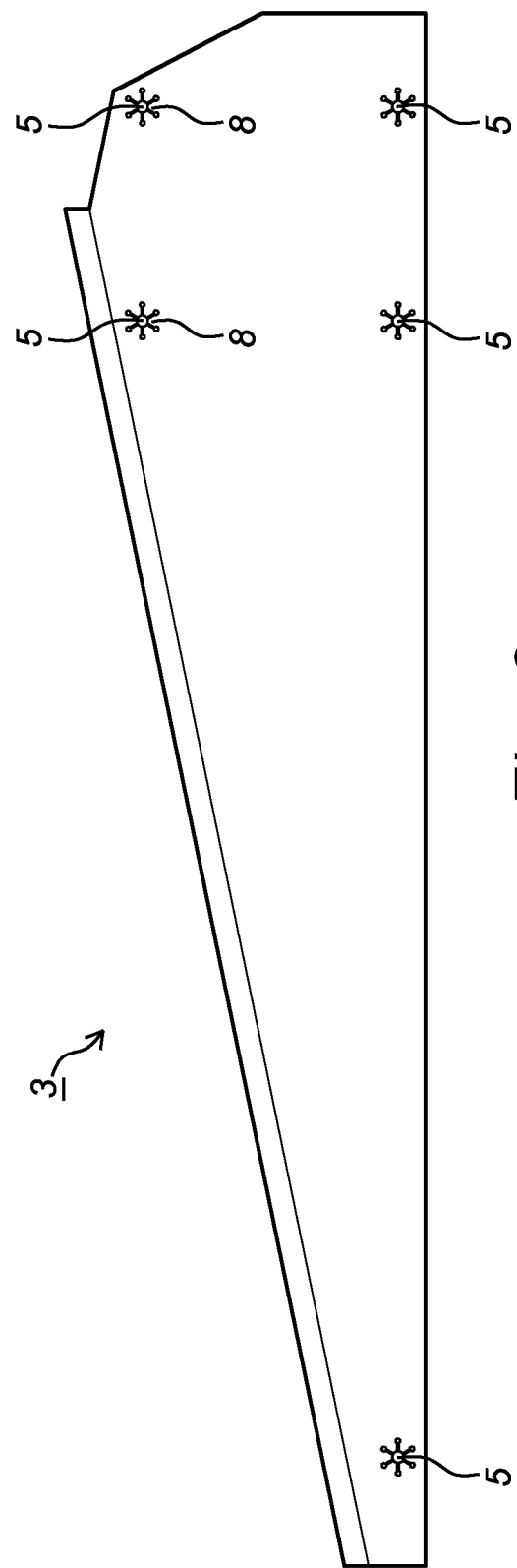
FIG. 3 shows a side view of an accessory according to the invention.

FIG. 3 shows an accessory (3) which is coupleable to a carrying frame (2), as illustrated in FIG. 2, for producing a carrier structure according to FIG. 1. The accessory (3) is provided with receiving spaces (5) for receiving coupling pins (4) from the carrying frame (2). The receiving spaces (5) in the accessory (3) are provided with resilient locking elements (8). When the accessory (3) is coupled to the carrying frame (2), the locking elements (8) secure the accessory (3). The locking elements (8) engage with the coupling pins (4) themselves, for example, or with grooves (not shown) in these coupling pins (4).

Figure 4:
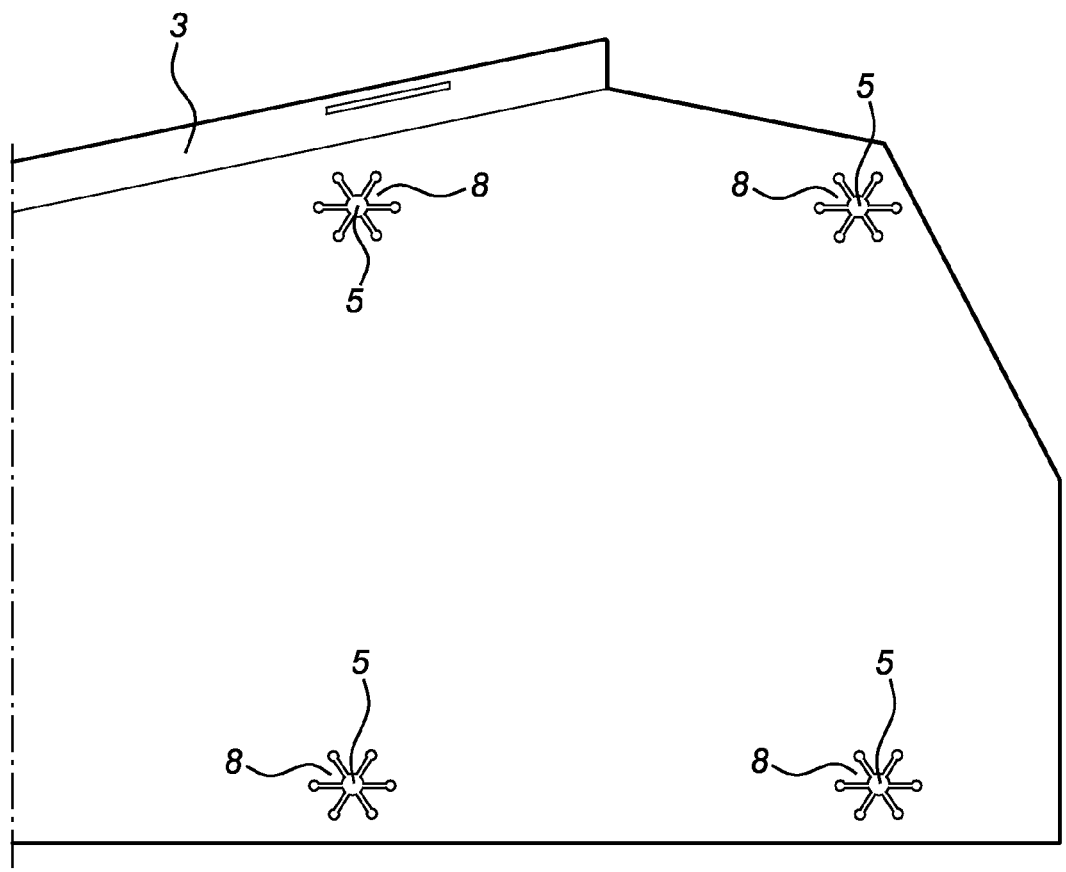
FIG. 4 shows a detail of the accessory from FIG. 3.

FIG. 4 shows a detail of the accessory (3) from FIG. 3 and shows in particular the receiving spaces (5) for receiving coupling pins (4) from the carrying frame (2) and the resilient locking elements (8).

Figure 5:
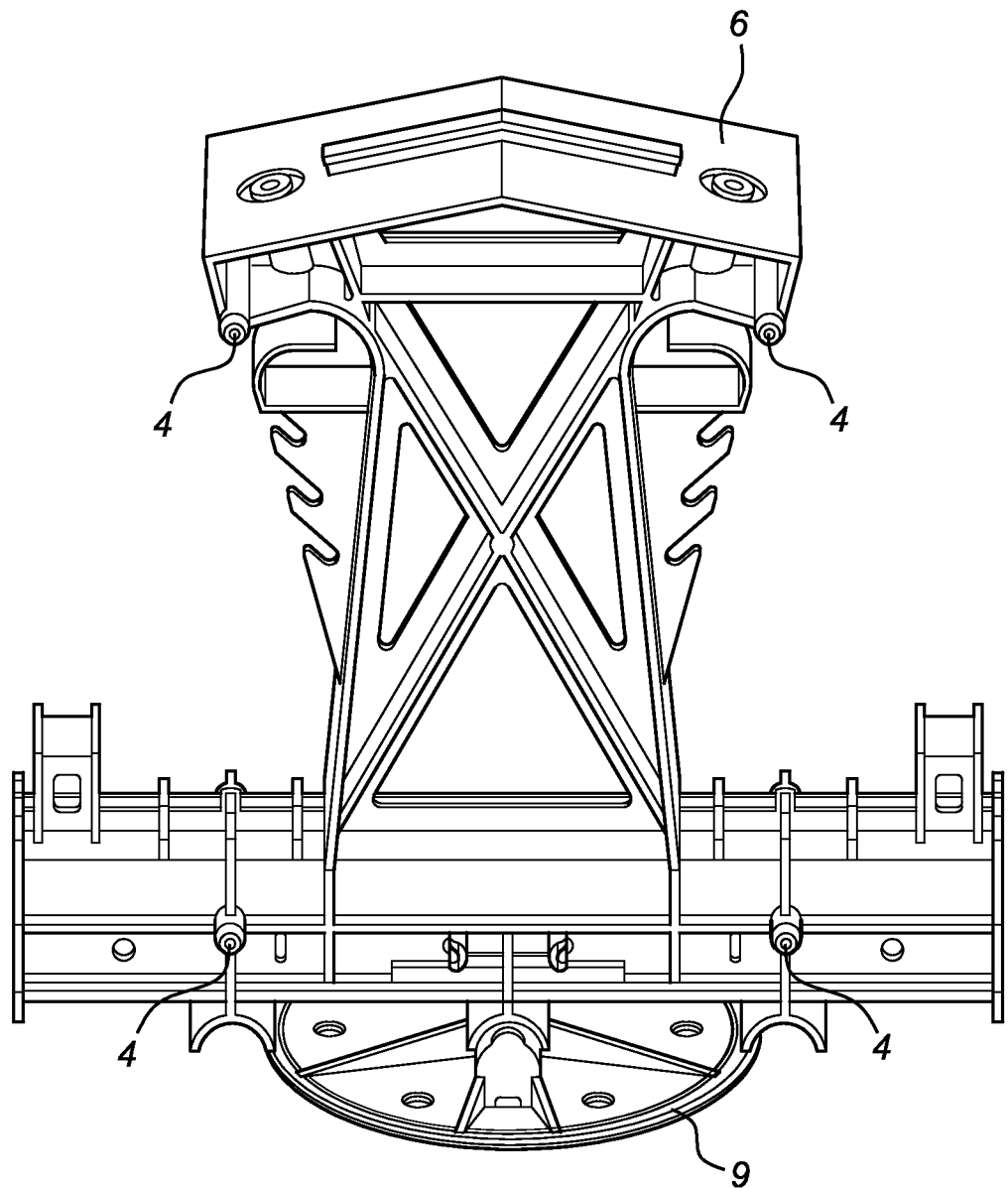
FIG. 5 shows a perspective view of a carrier of a carrying frame from FIG. 2.

FIG. 5 shows a carrier (6) which can be used in a carrying frame (2) according to FIG. 1 or 2. The carrier (6) is provided with coupling pins (4) configured to be at least partly received in receiving spaces (5) in the accessory (3). The carrier is also provided with an optional foot (9) for resting on the surface beneath it.

Figure 6:
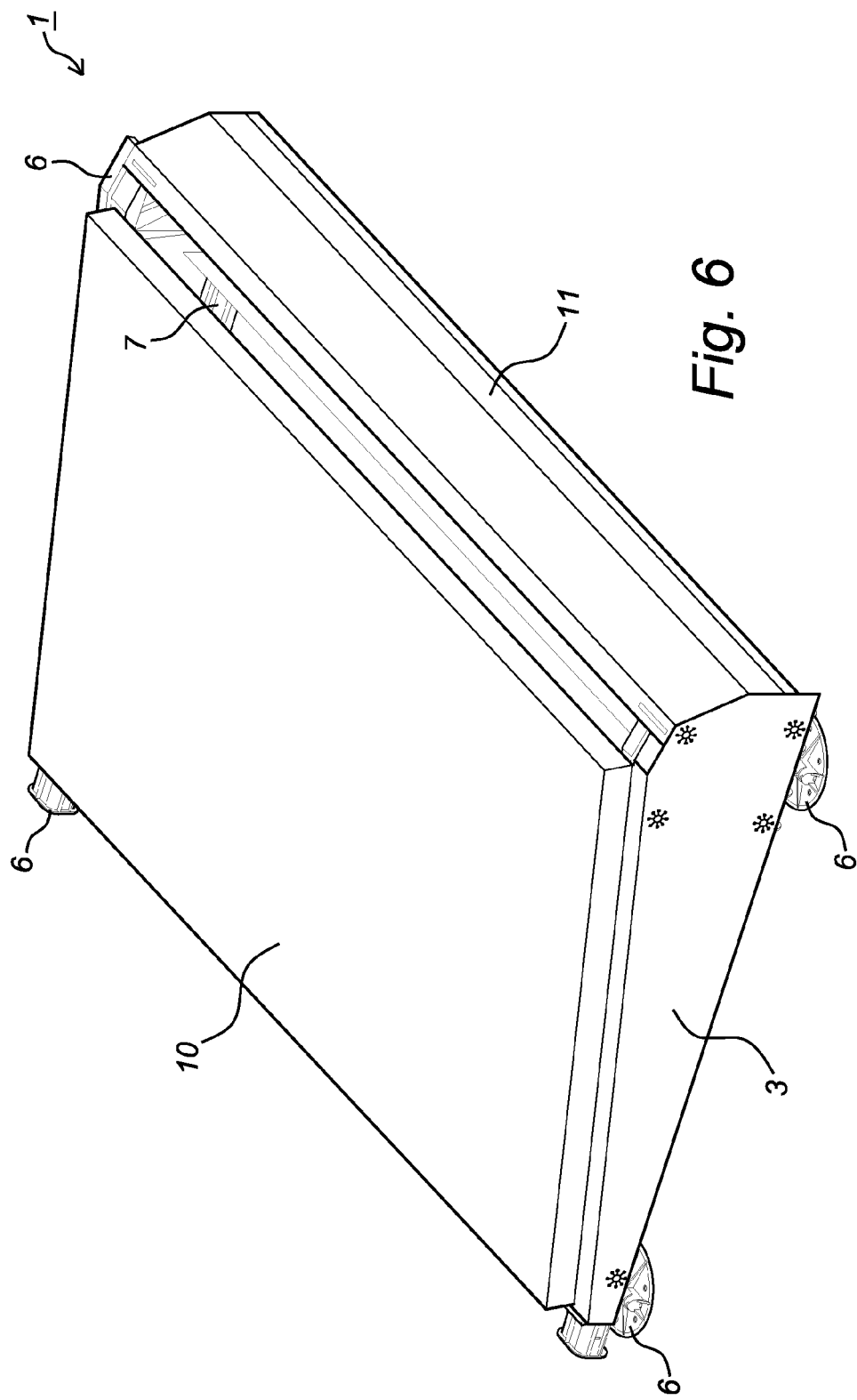
FIG. 6 shows a perspective view of an assembly of a carrier structure from FIG. 1 and a solar panel situated on top thereof.

FIG. 6 shows an assembly of a carrier structure (1) according to the present invention and a solar panel (10). The carrier structure (1) consists of a carrying frame (2), with two beams (7) and four carriers (6). The solar panel (10) is supported by the carriers (6). The carrier structure (1) is also provided with an optional back panel (11).

Figure 7:
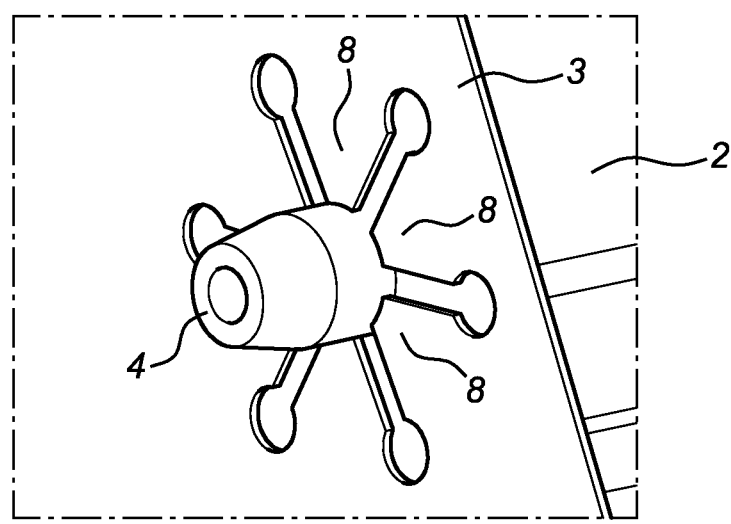
FIG. 7 shows a detail of the coupling of a carrier structure and an accessory according to the invention.

FIG. 7 shows a detail of the coupling between an accessory (3) and a coupling pin (4) of a carrying frame (2). The coupling pin (4) is received in a receiving space (5) of the accessory (3). The receiving spaces (5) in the accessory (3) are provided with resilient locking elements (8) which secure the accessory (3). The locking elements (8) engage with the coupling pin (4) itself, for example, as a result of which the locking elements (8) sink into the coupling pin (4), or the locking elements (8) engage with pre-formed grooves (not shown) in these coupling pins (4).

It will be clear that the invention is not limited to the exemplary embodiments described and illustrated here, but that countless variants which are obvious to a specialist in this field are possible without departing from the scope of the attached claims.

The inventive concepts described above have been illustrated by means of several illustrative embodiments. It is conceivable for individual inventive concepts to be used without also applying the other details of the described example. It is not necessary to elaborate on examples of all conceivable combinations of the above-described inventive concepts, as someone skilled in the art will understand that several inventive concepts can be (re)combined in order to arrive at a specific use.

The invention claimed is:

1. A carrier structure for solar panels, comprising:
   at least one carrying frame configured to carry at least a part of at least one solar panel, and
   at least one accessory which is coupleable to the carrying frame,
   wherein at least one of the at least one carrying frame and the at least one accessory comprises at least one coupling pin configured to be at least partly received in a complementary receiving space provided in at least one of the at least one accessory or the at least one carrying frame, wherein the coupling pin and/or the receiving space is provided with at least one locking element for locking the accessory and the carrying frame to each other when the coupling pin is being fitted in the receiving space, and wherein the receiving space is provided with at least one locking element being configured to cut into an outer periphery of the coupling pin, and
   wherein the outer periphery of the coupling pin is made from a softer material than the material from which the locking element is made.

2. The carrier structure as claimed in claim 1, wherein the receiving space is provided with at least one resilient locking element which is configured to engage in a clamping manner, in the coupled position, with an external side of the coupling pin.

3. The carrier structure as claimed in claim 1, wherein the at least one locking element defines at least a part of an inner periphery of the receiving space.

4. The carrier structure as claimed in claim 2, wherein the receiving space is provided with several locking elements which are configured to engage, in the coupled position, with an external side of the coupling pin in a clamping manner, wherein the locking elements together define at least a part of an inner periphery of the receiving space.

5. The carrier structure as claimed in claim 4, wherein the locking elements together define the entire inner periphery of the receiving space.

6. The carrier structure as claimed in claim 4, wherein the locking elements are positioned a distance apart.

7. The carrier structure as claimed in claim 4, wherein the locking elements are distributed substantially evenly over the inner periphery of the receiving space.

8. The carrier structure as claimed in claim 1, wherein the dimensions of the inner periphery of the receiving space are smaller than the dimensions of an outer periphery of the coupling pin.

9. The carrier structure as claimed in claim 1, wherein the at least one locking element is configured to engage with an inner periphery of the receiving space and/or an outer periphery of the coupling pin, in such a way that, on one side, the locking element and, on the other side, the inner periphery of the receiving space and/or the outer periphery of the coupling pin enclose an angle.

10. The carrier structure as claimed in claim 1, wherein an inner periphery of the receiving space and/or an outer periphery of the coupling pin is provided with a groove for receiving at least a part of at least one locking element.

11. The carrier structure as claimed in claim 10, wherein the accessory and the carrying frame are configured to be coupled by means of a click-fit connection.

12. The carrier structure as claimed in claim 1, wherein the accessory is formed by a wind guard.

13. The carrier structure as claimed in claim 1, wherein the accessory is formed by a cable trough.

14. A carrier structure for solar panels, comprising:
   at least one carrying frame configured to carry at least a part of at least one solar panel, and
   at least one accessory which is coupleable to the carrying frame,
   wherein at least one of the at least one carrying frame and the at least one accessory comprises at least one coupling pin configured to be at least partly received in a complementary receiving space provided in at least one of the at least one accessory or the at least one carrying frame, wherein the coupling pin and/or the receiving space is provided with at least one locking element for locking the accessory and the carrying frame to each other when the coupling pin is being fitted in the receiving space, and wherein the receiving space is provided with at least one locking element being configured to cut into an outer periphery of the coupling pin, and
   wherein the accessory is provided with several receiving spaces, wherein each receiving space is provided with at least one locking element, and wherein the carrying frame comprises several coupling pins configured to be at least partly received in the respective receiving spaces for mutually locking the accessory with respect to the carrying frame.

15. The carrier structure as claimed in claim 1, wherein the carrying frame comprises at least one carrier for supporting at least a part of at least one solar panel and at least one substantially elongate beam which is coupleable to the carrier at one end.

16. The carrier structure as claimed in claim 15, wherein the carrier is provided with at least one coupling pin.

17. A carrier structure for solar panels, comprising:
at least one carrying frame configured to carry at least a part of at least one solar panel, and
at least one accessory which is coupleable to the carrying frame,
wherein at least one of the at least one carrying frame and the at least one accessory comprises at least one coupling pin configured to be at least partly received in a complementary receiving space provided in at least one of the at least one accessory or the at least one carrying frame, wherein the coupling pin and/or the receiving space is provided with at least one locking element for locking the accessory and the carrying frame to each other when the coupling pin is being fitted in the receiving space, and wherein the receiving space is provided with at least one locking element being configured to cut into an outer periphery of the coupling pin,
wherein the carrying frame comprises at least one carrier for supporting at least a part of at least one solar panel and at least one substantially elongate beam which is coupleable to the carrier at one end, and
wherein the carrying frame comprises several carriers for supporting at least a part of at least one solar panel, wherein each end of the elongate beam is coupleable to one of the aforementioned carriers.

18. The carrier structure as claimed in claim 15, wherein the carrier extends in a upright direction, in particular in a substantially vertical direction.

\* \* \* \* \*